United States Patent Office 3,297,090
Patented Jan. 10, 1967

3,297,090
ACIDIZING OIL FORMATIONS
Richard E. Dilgren, Houston, Tex., assignor to Shell Oil Company, New York, N.Y., a corporation of Delaware
No Drawing. Filed Apr. 24, 1964, Ser. No. 362,482
11 Claims. (Cl. 166—38)

The invention relates to the treatment of subterranean formations penetrated by well bores, and more particularly pertains to methods for the treatment of such formations with acid to effect an increase in permeability and/or porosity of carbonate reservoirs, preferably of the oil-bearing type. The present application is a continuation-in-part of patent application, Serial No. 260,319, filed February 21, 1963, which has materialized as U.S. Patent No. 3,215,199 on November 2, 1965.

Acidization of earth formations, particularly calcereous earth formations, has been practiced for some time for the purpose of increasing the permeability of flow of fluids therethrough. In the usual well acidizing operations, a hydrochloric acid solution is introduced into the well, and, when sufficient pressure is available or supplied, and the formation is sufficiently permeable, the acid also enters the adjacent subterranean formation. However, this method has the disadvantage of producing an ineffective acidizing action because the acid is largely neutralized by the reactive material immediately adjacent the well bore before the acid can reach other desired portions of the formation.

It is therefore the main object of the present invention to avoid the above and other defects of the prior art processes of acidizing oil formations. It is another object of the invention to provide a process whereby a major portion of the inorganic acid necessary for the acidization is produced or liberated in situ in the region where it is desired to effect the acidization of the formation. It is still another object to provide a formation acidization process particularly applicable to treatment of moderate and relatively high temperature formations or reservoirs. Still another object is to provide an acidizing fluid capable of remaining substantially inert in respect to its acidizing action during a selected portion of the relatively long time required to inject an acidizing fluid deep into a subterranean formation.

A primary object of the present invention is to provide a method of increasing the permeability and/or porosity of an earth formation penetrated by a well borehole, said increase in permeability and/or porosity being carried out in a manner such that the greatest increase takes place in the vicinity of the borehole with the increase becoming less as the radial distance from the borehole increases.

A further object of the present invention is to provide a method of determining the pressure drop from a formation to a well and then increasing the permeability of the formation in a manner such that the increase in formation permeability with distance from the well is, preferably, qualitatively the mirror image of the fall off of pressure from the formation into the well.

A further object of the present invention is to provide a method of mixing an allylic monohalide with a solvating medium and a catalyst for an allylic halide solvolysis reaction, to form a substantially homogeneous liquid in which the halide and the solvating agent are reacting at a rate exceeding the rate of their reaction in the absence of the catalyst, and pumping the liquid through the well and into a subsurface earth formation at a rate at which a selected proportion of the halide is converted to an inorganic acid by the time it enters the earth formation.

It has been discovered that the above and other objects of the present invention may be attained by using organic haldies which are caused to react in situ with a solvating medium to form as one of the products of reaction, hydrogen halide. The invention may therefore be stated to reside broadly in a process of treating a subterranean earth formation by contacting and injecting into it a liquid containing, comprising or even consisting essentially of an organic halide which is dissolved in or intimately contacted or commingled with a solvating medium and a catalyst for solvolysis reactions of the organic halide, said organic halide and solvating medium being capable of reacting at the formation temperature to produce a hydrogen halide and being present in proportions sufficient to produce enough hydrogen halide to cause acidization of the subterranean formations. Also, it is highly desirable that the organic halide, the solvating medium and the catalyst are selected and compounded to form a liquid mixture in which their rate of reaction is relatively slow at the ambient temperature at the well site but is significantly more rapid and comprises a preselected rate at the temperature of the formation that is to be treated. Where it is desirable to acidize portions of the formation immediately adjacent to the well, e.g., to reduce a "skin effect" or to enlarge small fractures and/or pores, the reaction rate is preferably much higher at the formation temperature than it is at the surface temperature. Where it is desirable to acidize a large interval or a tight formation, e.g., in treating a low permeability gas reservoir, the reaction rate is preferably comparatively slow but significantly more rapid at the formation temperature than it is at the surface temperature.

The invention may therefore be stated to reside also in a process of treating a subterranean formation traversed by a well by introducing through said well and injecting into the formation a single, substantially homogeneous, acid-producing treating liquid comprising, containing or consisting of a reactive mixture of an organic halide and a solvating medium in the presence of a catalyst providing a rate of reaction which varies with temperature, said reagents and catalyst being so selected that they react very slowly, while the treating liquid mixture is conveyed into the well and through a portion of the well conduit, but will interact more rapidly to form an active acid (namely, hydrogen halide) at the temperature existing in the formation to be treated.

In one of its more specific embodiments, the process of the present invention comprises: introducing into a formation to be acidized a liquid mixture (which term includes within its definition a solution) comprising, containing, or consisting of an allylic monochloride and an aqueous solution of an aliphatic alcohol in amounts to produce within the formation, by solvolysis, sufficient hydrogen chloride to increase substantially the productivity of the subterranean formation, by acidization by said inorganic acid; and maintaining said introduced mixture or solution in the formation for a time sufficient to effect, at the formation temperature, said interaction between the allylic monochloride and the aqueous alcohol solution to convert substantially all of the allylic chloride to hydrogen chloride, thereby producing sufficient hydrogen chloride for said acidization.

An advantage of using the process of the present invention, i.e., a process in which a single substantially homogeneous liquid is injected into the formation resides in the ability of selecting the proper or suitable organic halide, solvating medium and catalyst so that they react in the formation to be treated (i.e., at the particular formation temperature) to convert all of the organic halide to produce the desired active acid (i.e., hydrogen halide acid).

Both the total amount of the two reactants, i.e. the organic halide and the solvating medium, as well as the ratio of one to the other may vary within rather wide limits. In acidizing a subterranean formation, it is generally preferable to employ a ratio of the reactants in which there is a stoichiometric excess of the solvating medium. In so acidizing a formation, the hydrogen halide reacts with components of the formation substantially as soon as the hydrogen halide is formed. The reaction between the organic halide and the solvating medium proceeds to completion and produces an amount of hydrogen halide equivalent to the amount of the organic halide which was used.

Another reason for not using a mixture or solution having a stoichiometric excess of the organic halide is that it is normally highly undesirable to produce a crude oil containing even minute quantities of organic halide. The reason for this is that this organic halide normally adversely affects the catalyst used in the platformer treatment to which crude oils are usually subjected in refineries where the oils are contacted with expensive catalysts that are "poisoned" by halogens. The organic halide and the solvating medium can be selected and proportioned to yield solvolysis reaction products equivalent to acidizing solutions ranging from relatively dilute solutions, e.g. containing less than about 5 percent by weight of acid per volume of liquid, to relatively concentrated acidizing solutions, e.g. solutions in which the acid concentration is about 20 percent. In acidizing a subterranean formation by the process of the present invention, the reactants are preferably employed in a ratio productive of a solvolysis reaction product equivalent to a solution containing at least one percent hydrogen halide. In practice, such a concentration is never actually attained because the hydrogen halide is spent in the acidization reaction substantially as fast as the acid is formed.

Although various organic halides may be used as one of the reactants which, according to the invention, will form in situ the desired inorganic acid, it is preferable to employ aliphatic halides which may be either saturated or unsaturated provided they form by solvolysis the desired inorganic halide. A preferred class of these aliphatic halides are the saturated monohalides and the allylic monohalides. Illustrative examples of these compounds are n-propyl chloride, isopropyl chloride, t-butyl chloride, allyl chloride, crotyl chloride, methyl vinyl carbinyl chloride, as well as the corresponding bromides and iodides, e.g. allyl bromide, allyl iodide, t-butyl bromide, and t-butyl iodide. The organic halide used as a reactant in the present process can be one containing functional groups other than halogen atoms. Examples of suitable polyfunctional organic halides include ethers such as bis-betachloroisopropyl ether, cyclic ethers such as epichlorohydrin, as well as a compound such as 1,3-dihydroxy-2-chloropropane which is sufficiently hydrophilic to dissolve enough water to effect solvolysis reaction. Organic fluorides are generally less suitable as reactants in the present process because of their tendency to form insoluble calcium fluorides, but the organic fluorides can be used whenever it is desirable to contact a calcium-free formation with a mixture of hydrogen fluoride and an oil-miscible solvent. The allylic monohilides, and allyl chloride in particular, are especially suitable because of their current availability, low cost and susceptibility to reaction rate increases the increase in proportion to the amount of catalyst incorporated into a mixture of allylic monohalide and solvating medium.

The rates of solvolysis of these various organic halides vary within a rather wide range even though the solvolysis is effected at the same temperature and using the same solvating medium. This can be seen from the following table which presents the rates of solvolysis of a number of organic chlorides in 90% aqueous isopropyl alcohol at about 200° F.

| Compound: | $10^4 k_s$ (min.$^{-1}$) |
|---|---|
| n-Propyl chloride | 0.0935 |
| Isopropyl chloride | 0.165 |
| Tert-butyl chloride | 506 |
| Allyl chloride | 1.62 |
| Crotyl chloride | 30.3 |

The term $k_s$ used herein refers to the first-order rate constant for solvolysis. Thus, $-d[\text{RCl}]/dt = d[\text{HCl}]/dt = k_s[\text{RCl}]$ where [RCl] and [HCl] refer to concentrations of alkyl chloride and hydrochloric acid in moles (M) per liter.

A similar test showed that allyl bromide in 90% aqueous isopropyl alcohol at 200° F. liberates hydrobromic acid 29.7 times more rapidly than allyl chloride liberates hydrochloric acid. Also, allyl iodide is even more reactive than allyl bromide.

The various alkyl halides are generally oil soluble and only very slightly soluble in water. Depending on the formation temperature and assuming that a given solvating medium is used, one may prefer to use one or another of the various organic halides. Thus, it is known that the temperature in an oil well and also in the subterranean formations surrounding it and into which it is desired to introduce the agents which form the inorganic acid in situ, may vary from a low temperature in the neighborhood of 100° F. or below to temperatures as high as 450° F. and even higher. In order to effect the solvolysis at a desired rate in the formation rather than prematurely in the well, it is frequently preferrd (if not essential) to use an organic halide which is substantially inert or slowly reactive in respect to the production of hydrogen halide at the temperatures existing at the surface and in the upper portion of the well. Thus, in formations which are very hot, e.g., those having a temperature of about 350° F. or higher, it is well to consider using isopropyl chloride which is relatively slow in solvolysis reactions except at high temperatures. In formations having a temperature of about 190-350° F., satisfactory results have been obtained by the use of allyl chloride while in cooler wells one may use crotyl chloride and its isomer, while t-butyl chloride, which is the most reactive of the above-mentioned chlorides, would be suitable for use in quite cool formations.

It has been stated that it is preferred to use alkyl monohalides. However, organic compounds having more than one halogen may also be used providing both will react under the operating conditions or providing that such compounds are used in situations in which no organic halide becomes dissolved in the oil recovered from the formation since otherwise the organic halide presence may be detrimental during the further treatment of the recovered oil.

The solvating medium to be used in connection with the organic halide is a compound which contains unshared electron pairs on an atom of the group consisting of oxygen and nitrogen atoms and is a liquid capable of reacting at the temperature of the subterranean formation with the organic halide to yield the corresponding hydrogen halide. The solvating medium should be substantially inert to and preferably non-reactive with the hydrogen halide in respect to altering the capability of the hydrogen halide to acidize the reservoir formation under the reservoir conditions. Although various compounds including ketones, such as acetone and methyl ethyl ketone, nitriles, such as acetonitrile, propionitrile, cyclic ethers, such as the dioxanes and furans, etc., fall within the above class of solvating media which may be used as one of the reactants to form the hydrogen halide in situ, the preferred class of compounds comprises hydroxylic solvents in which a hydroxyl radical is attached to a radical which is selected from the group consisting of the hydrogen atom, an alkyl radical, and an acryl radical, which latter two radicals preferably do not contain more than ten carbon atoms. This hydroxylic solvent may also consist of a mixture of two or more compounds falling within the just-defined group of compounds. Therefore, the term "solvating medium" also includes mixtures of two or more compounds of the class defined herein.

The first compound of the preferred class of compounds defined immediately above, i.e., the compound in which the hydroxylic radical is attached to the hydroxyl radical is water; the second group of compounds comprises the alcohols which may be water soluble and/or oil soluble, including methyl alcohol, ethyl alcohol, and propyl alcohol, isopropyl alcohol, the butyl alcohols, including t-butyl alcohol, amyl alcohols and their higher homologs, as well as unsaturated alcohols, e.g., allyl alcohol. As to the third group, i.e., in which the hydroxyl radical is attached to an acyl radical, these are exemplified by the organic acids, e.g. acetic acid, propionic acid, the butyric acids, and the like. An organic acid such as acetic acid is capable of acidizing subterranean formations. The use of such an organic acid as the solvating medium in the present process provides a liquid which is immediately reactive in respect to acidization by the organic acid and is retarded in respect to acidization by the hydrogen halide that is formed by solvolysis reaction.

As stated above, the above-described preferred hydroxylic solvents may be used individually or in the form of mixtures containing two or more thereof. Thus, a preferred solvating medium comprises an aqueous solution of one of the aliphatic alcohols, e.g. isopropyl alcohol in water. An increase in the water-alcohol ratio changes the rate of solvolysis and acid production and generally increases the rate, but the amount of the change in the rate is dependent upon the mechanism of the individual solvolysis reaction. Thus, the solvolytic rate constants for 1.07M t-butyl chloride at about 120° C. in isopropyl alcohol-water mixtures varies from $0.751 \times 10^{-3}$ min.$^{-1}$ for 90% aqueous isopropyl alcohol to 0.104 min.$^{-1}$ for 50% aqueous isopropyl alcohol.

The reates of solvolysis, i.e. production of hydrogen chloride for a given alkyl chloride at a given temperature can also be altered by changing the nature of the alcohol at a constant alcohol-water ratio. The following are the solvolytic rate constants for 1.07M t-butyl chloride in 90% aqueous alcohol at 120° F.

Solvent composition: $10^3 k_s$ (min.$^{-1}$)
90% aqueous methyl alcohol _____ 4.18
90% aqueous isopropyl alcohol _____ 0.751
90% aqueous tert-butyl alcohol _____ 0.408

It is thus seen that for these particular conditions of temperature and concentration of t-butyl chloride a change from methyl alcohol to t-butyl alcohol decreased the rate of liberation of hydrochloric acid by a factor of about 10. The following table shows the change in rate constants and half-lives with changes in temperature.

[Solvolytic rate constants for 1.07 M. (molar) tert-butyl chloride in 90% aqueous isopropyl alcohol at various temperatures]

| Temperature, ° F. | $10^3 k_a$ (min.$^{-1}$) | $t\frac{1}{2}$ (min.) |
|---|---|---|
| 120° F | 0.751 | 923 |
| 175° F | 13.2 | 52.5 |
| 200° F | 50.6 | 13.7 |

As pointed out hereinabove, the rate at which acid is generated in a well or in the formation adjacent the well, can be controlled to some extent by selection of the proper organic halide to be combined with the proper solvating medium for the temperature conditions under which the mixture is to be employed. In addition to controlling the rate at which acid is produced by the above method, it has also been found to be advantageous at times to employ a catalyst capable of increasing the rate of acid production from an organic halide to a solvating medium. This often makes it possible to use a economical combination of reactants, e.g. one in which the organic chloride is allyl chloride, that would react too slowly in the absence of the catalyst.

The main purpose in adjusting the rate of acid formation is to cause the major portion of the acid to be generated at a rate such that, as the liquid in which the acid is forming moves into the earth formation, the greatest amount of rock will be dissolved by the acid close to the borehole, with a corresponding increase in permeability of the formation in this region. As the liquid moves onward, more of the acid is generated at greater radial distances from the borehole, and some, but less, rock will be dissolved in the individual capillary passages at greater distances from the borehole. Treatment of the formation adjacent a well in this manner provides the formation with a permeability profile wherein the greatest permeability is close to the well and the permeability diminishes with increases in the radial distance from the well.

It is well known that where a well is drilled into an oil-bearing formation, say one well for each 40 acres, there is a pressure drop existing in the formation as all the oil from the 40 acres attempts to drain into, say, a 6 inch well borehole. The pressure drop from a formation into a well is measurable and may be calculated and plotted as a curve by methods well known to the art. In order to obtain the greatest production of oil from the well, it is desirable to acidize the well by the method of the present invention with the reaction mixture and the catalyst being selected in a manner so as to generate acid at a rate such as to dissolve portions of the formation adjacent the well is achieved which is, preferably, qualitatively the mirror image of the decrease in pressure drop from the formation to the well. By having the acid dissolve the greatest amount of rock near the well, the flow channels so generated are of a size to handle the combined flow of fluid coming from all directions of the 40 acre field.

It has been found that a particularly good catalyst for use in catalyzing the hydrolysis of the organic halide of the present invention, for example, allyl chloride, comprises a water-soluble compound containing cuprous ions, such as cuprous chloride or cuprous nitrate. In general, the catalyst may comprise any of the solvolysis reaction catalysts that are compatible with the components of a liquid containing an organic halide, a solvating medium and the acid soluble compounds of a subsurface earth formation. The capability of cuprous ions to act as a catalyst under conditions existing in a carbonate reservoir was demonstrated by the addition of 0.2% cuprous chloride in aqueous solution to a mixture containing 42% by weight allyl chloride, 14% by weight water and 44% by weight isopropyl alcohol. A substantial enhancement of the rate of acid formation was observed. Deaereated water was used in preparing the acidizing solutions so as to minimize deactivation by air-oxidation of the catalyst ions to the non-catalytic cupric ions. With the reaction taking place at 91° C. (the bottom hole temperature encountered in wells in the Virginia Hills Field and the Cedar Creek Anticline) the use of 42% by weight of allyl chloride with or without the cuprous ion catalyst was capable of yielding 20% by weight of hydrochloric acid. The mixture without the catalyst present yielded only 1% of hydrochloric acid in 300 minutes and 3% in 1350 minutes. On the other hand, in the presence of 0.2% cuprous chloride, the mixture yielded at 5% of hydrochloric acid in 100 minutes and 10% in 750 minutes. From 0.01 to 2.0% or more of a material containing cuprous ions may be employed.

Since the cuprous ions of the catalyst are readily oxidized to the non-catalytic cupric ion state by oxygen in the air, in the event that the water being used in carrying out the method of the present invention contains dissolved oxygen, it is preferable to also add a reducing agent to the mixture to prevent deactivation of any of the cuprous ions; which would result in decrease in rate of reaction for acid formation in the well or adjacent formation. One of the best materials found for use with the method of the present invention is hydrazine. The hydrazine not only acts as a oxygen scavenger in the water but is also capable of reducing the non-catalytic cupric ions to catalytic cuprous ions. This reduction is extremely slow in an acid medium, better at neutral conditions, and instantaneous in an alkaline medium. Ammonia or other water-soluble alkaline materials may be added to maintain the mixture alkaline at the beginning of the reaction.

Thus, in mixing an allylic monohalide with a solvating medium and a catalyst containing cuprous ions, the following procedure is particularly suitable for incorporating such components into an aqueous solution and pumping the solution through a well and into a subsurface earth formation: (1) an allylic monohalide such as allyl chloride, an alcohol such as isopropanol, and hydrazine are mixed in a container near the wellhead. (2) Water, a catalyst such as cuprous chloride, and an alkali such as ammonium hydroxide, are mixed in a separate container near the wellhead. The amounts of the materials in each of the containers are adjusted so that when portions from each are mixed, the mixture contains the selected proportions of reagents, e.g. comprises about 42% w. allyl chloride, 14% w. water, and 44% w. isopropyl alcohol in the presence of about 0.2% w. cupric chloride, slightly more than enough hydrazine to reduce the cupric ions to cuprous ions and enough ammonium hydroxide to render the mixture alkaline. Such proportions provide a mixture comprising an aqueous solution capable of becoming an aqueous solution containing 20% w. hydrochloric acid. (3) Streams of fluid from each of the containers are combined in, for example, equal portions and the resulting mixture is pumped through the well and injected into the subsurface earth formation. As the streams are mixed, the cupric ions, which are present in the form of cupric ammonium complexes, are substantially instantaneously converted to cuprous ions by their reaction with the hydrazine. Thus, any tendency of the cupric ions to plate out on ferrous metal surfaces is avoided. In addition, the presence of the slight excess of hydrazine prevents any oxidation of the cuprous ions by oxygen dissolved in the water since the hydrazine removes the dissolved oxygen in the $H_2O$ when the two streams mix.

I claim as my invention:

1. A process of treating a subterranean formation penetrated by a well bore, which comprises introducing through said well bore and injecting into said formation a liquid mixture comprising an organic halide and, as a solvating medium, a compound containing an atom with unshared electron pairs from the group of atoms consisting of oxygen and nitrogen atoms, said solvating medium being capable of reacting at the temperature of the subterranean formation with the organic halide to yield hydrogen halide, said liquid mixture containing an organic halide solvolysis-reaction catalyst to speed up the formation of said hydrogen halide.

2. A process of treating an oil-bearing subterranean formation penetrated by a well bore, which comprises introducing into said formation through said well a liquid mixture containing an allylic monohalide and, as a solvating medium, a compound containing an atom with unshared electron pairs from the group of atoms consisting of oxygen and nitrogen atoms, said liquid mixture containing an allylic monohalide and a solvating medium capable of reacting at the temperature of the subterranean formation with the organic halide to yield a liquid mixture containing at least about one percent by weight per volume of hydrogen halide, said liquid mixture containing a catalyst containing cuprous ions to speed up the formation of said hydrogen halide, and maintaining said liquid mixture in contact with the formation to dissolve a portion of the latter and thereby increase the permeability thereof.

3. A method of increasing the flow capacity of an oil-bearing subterranean carbonate formation penetrated by a well bore, which comprises simultaneously introducing into said formation through said well bore an allylic monohalide and a hydroxylic solvent in which the radical attached to the hydroxy radical is selected from the group consisting of the hydrogen atom, an alkyl radical and an acyl radical, said aliphatic monohalide and said hydroxylic solvent being present in amount to produce by solvolysis sufficient hydrogen halide to increase substantially the flow capacity of the subterranean formation by reaction between the hydrogen halide and solid components of the formation, said liquid mixture containing a catalyst containing cuprous ions to speed up the formation of said hydrogen halide, and maintaining said hydroxylic solvent and said aliphatic monohalide in said formation for a time sufficient to permit, at the temperature of the formation, a reaction therebetween to form the hydrogen halide to effect acidizing of the carbonate formation therewith.

4. A method of increasing the flow capacity of a subterranean formation penetrated by a well bore, which comprises introducing into said formation through said well bore a liquid mixture containing an allylic monohalide and a hydroxylic solvent in which the radical attached to the hydroxyl radical is selected from the group consisting of the hydrogen atom, an alkyl radical and an acyl radical, said liquid mixture including a catalyst containing cuprous ions, and said aliphatic halide and said hydroxylic solvent being present in said mixture in amounts to produce by solvolysis in the presence of said catalyst sufficient hydrogen halide to increase substantially the flow capactiy of the subterranean formation by reaction between said hydrogen halide and solid carbonate components of the formation; and maintaining said introduced mixture in said formation for a time sufficient to effect, at the formation temperature, interaction between said allylic halide and the hydroxylic solvent to produce sufficient hydrogen halide to acidize the subterranean formation.

5. The method according to claim 4 wherein the allylic monohalide is a monochloride, and wherein said cataylst containing said cuprous ions is present in an amount of at least 0.01% by weight.

6. A method of increasing the flow capacity of a subterranean formation penetrated by a well bore, which comprises introducing into said formation through said well bore a liquid solution of an allylic monohalide, water, and an aliphatic alcohol, at least 0.01% by weight of a cuprous ion containing catalyst, said aliphatic monohalide and said aqueous alcohol solution being present in said mixture in amounts to produce by solvolysis sufficient hydrogen halide to increase substantially the productivity of the subterranean formation by reaction between said inorganic acid and solid components of the formation, and maintaining said introduced mixture in said formation for a time sufficent to effect, at the formation temperature, interaction between said allylic monohalide and said aqueous alcohol solution to produce sufficient hydrogen halide to cause acidization of the subterranean formation.

7. The method according to claim 6 wherein the allylic monohalide is allyl chloride and the liquid mixture contains a reducing agent in an amount sufficient to prevent oxidation of said cuprous ions.

8. The method according to claim 7 wherein the reducing agent is hydrazine.

9. The method according to claim 8 wherein the mixture contains sufficient water-soluble alkaline material to provide the mixture alkaline.

10. A process of treating a subterranean formation penetrated by a well comprising forming a mixture of allyl chloride; in a hydroxylic solvent in which the radical attached to the hydroxyl radical is selected from the group consisting of the hydrogen ion, an alkyl radical an allyl radical, and an acyl radical; a reducing agent and a water-soluble compound containing cuprous ions catalyst and pumping said mixture through the well into the subterranean formation.

11. The process of claim 10 in which: the allyl chloride, an alcohol, and hydrazine as the reducing agent are mixed in one container; the catalyst, water, and ammonium hydroxide are mixed in a separate container; and streams from each of said containers are combined and pumped through the well into the subterranean formation.

References Cited by the Examiner

UNITED STATES PATENTS

| | | | |
|---|---|---|---|
| 2,059,459 | 11/1936 | Hund et al. | 166—38 |
| 2,225,695 | 12/1940 | Henderson et al. | 166—42 X |
| 2,910,436 | 10/1959 | Fatt et al. | 166—42 X |
| 3,070,164 | 12/1962 | Gordon | 166—38 X |
| 3,157,232 | 11/1964 | Ramos et al. | 166—38 |

JACOB L. NACKENOFF, *Primary Examiner.*

CHARLES E. O'CONNELL, *Examiner.*

D. H. BROWN, *Assistant Examiner.*